United States Patent
Pino et al.

(10) Patent No.: US 11,462,881 B2
(45) Date of Patent: Oct. 4, 2022

(54) METHOD AND DEVICE FOR ALTERING REPETITION RATE IN A MODE-LOCKED LASER

(71) Applicant: Vescent Photonics LLC, Golden, CO (US)

(72) Inventors: Juan Pino, Denver, CO (US); Eng Hiang Mark Yeo, Lakewood, CO (US); Kurt Richard Vogel, Boulder, CO (US)

(73) Assignee: Vescent Photonics LLC, Golden, CO (US)

( * ) Notice: Subject to any disclaimer, the term of this patent is extended or adjusted under 35 U.S.C. 154(b) by 0 days.

(21) Appl. No.: 15/997,883

(22) Filed: Jun. 5, 2018

(65) Prior Publication Data
US 2018/0351321 A1 Dec. 6, 2018

Related U.S. Application Data

(60) Provisional application No. 62/515,774, filed on Jun. 6, 2017.

(51) Int. Cl.
*H01S 3/11* (2006.01)
*H01S 3/105* (2006.01)
*H01S 3/094* (2006.01)
*H01S 3/10* (2006.01)
*H01S 3/106* (2006.01)
(Continued)

(52) U.S. Cl.
CPC ............ *H01S 3/1118* (2013.01); *G02B 27/30* (2013.01); *H01S 3/105* (2013.01); *H01S 3/067* (2013.01); *H01S 3/094003* (2013.01); *H01S 3/106* (2013.01); *H01S 3/10046* (2013.01)

(58) Field of Classification Search
CPC .......... H01S 3/1118; H01S 3/105; H01S 3/04; H01S 3/0401; H01S 3/0405
See application file for complete search history.

(56) References Cited

U.S. PATENT DOCUMENTS

| 4,355,323 A | * | 10/1982 | Kock | .................. G02B 6/4204 |
| | | | | 257/680 |
| 5,077,747 A | * | 12/1991 | Hemmer | ............... H01S 3/1062 |
| | | | | 372/20 |

(Continued)

FOREIGN PATENT DOCUMENTS

WO   WO-03085446 A2 * 10/2003 ......... H01S 3/10092

OTHER PUBLICATIONS

Technology for Atomic PNT Poster presented at the DARPA ACES Proposer's Day on Feb. 1, 2016 in Arlington, Virginia.
(Continued)

*Primary Examiner* — Sean P Hagan
(74) *Attorney, Agent, or Firm* — Red Rocks Law, LLC (57) ABSTRACT

A mode locking device is disclosed for altering repetition rate in a mode-locked laser. In an example device, laser light is coupled from a fiber into a cavity through a sliding pigtail collimator with a diameter selected such that it is a close tolerance fit with a female snout on a package. A lens focuses laser light to an appropriate spot size onto a SAM or SESAM, such that back-reflection into the fiber is maximized. A piezoelectric transducer is mounted in cooperation with the SAM or SESAM for cavity tuning.

20 Claims, 9 Drawing Sheets

(51) Int. Cl.
*H01S 3/067* (2006.01)
*G02B 27/30* (2006.01)

(56) References Cited

U.S. PATENT DOCUMENTS

| | | | |
|---|---|---|---|
| 5,627,848 A * | 5/1997 | Fermann | H01S 3/0675 |
| | | | 372/102 |
| 5,689,519 A | 11/1997 | Fermann et al. | |
| 6,097,741 A * | 8/2000 | Lin | H01S 3/067 |
| | | | 372/6 |
| 6,560,268 B1 * | 5/2003 | Deichsel | B82Y 20/00 |
| | | | 372/11 |
| 6,746,618 B2 | 6/2004 | Li et al. | |
| 6,785,303 B1 | 8/2004 | Holzwarth et al. | |
| 6,890,874 B1 | 5/2005 | Li et al. | |
| 6,996,136 B1 | 2/2006 | Carruthers et al. | |
| 7,088,756 B2 | 8/2006 | Fermann et al. | |
| 7,573,918 B1 | 8/2009 | Soh et al. | |
| 2001/0001006 A1 * | 5/2001 | Jiang | H01S 3/067 |
| | | | 372/99 |
| 2002/0064353 A1 * | 5/2002 | Yokoyama | G02B 6/4215 |
| | | | 385/88 |
| 2002/0196816 A1 * | 12/2002 | Shirasaki | H01S 3/08059 |
| | | | 372/20 |
| 2005/0128924 A1 * | 6/2005 | Nakae | G02B 6/4214 |
| | | | 369/121 |
| 2006/0120418 A1 * | 6/2006 | Harter | H01S 3/1086 |
| | | | 372/30 |
| 2009/0168816 A1 * | 7/2009 | McDonald | G02B 7/008 |
| | | | 372/20 |
| 2009/0213894 A1 * | 8/2009 | Grapov | H01S 3/0092 |
| | | | 372/107 |
| 2012/0327959 A1 | 12/2012 | Fermann et al. | |
| 2015/0318658 A1 * | 11/2015 | Molter | H01S 3/06704 |
| | | | 372/6 |

OTHER PUBLICATIONS

Hot Pressed (Pb, La)(Zr, Ti) O3 Ferroelectric Ceramics for Electrooptic Applications journal article by G. H. Haertling and C. E. Land, in the Journal of American Ceramic Society, vol. 54, No. 1, Jan. 1971, 11 pages.

Wikipedia, "Mode-locking," available at https://en.wikipedia.org/wiki/Mode-locking.Last Edited: Sep. 22, 2019. 7 pages.

L. C. Sinclair, J-D Deschenes, L. Sonderhouse, W. C. Swann, I. H. Khader, E. Baumann, N. R. Newbury and I. Coddington, "A compact optically coherent fiber frequency comb," Review of Scientific Instruments, vol. 86, pp. 081301-1-081301-15, 2015.

L. C. Sinclair, I. Coddington, W. C. Swann, G. B. Rieker, A. Hati, K. Iwakuni and N. R. Newbury, "Operation of an optically coherent frequency comb outside the metrology lab," Optics Express, vol. 22, pp. 6996-7006, 2014.

* cited by examiner

METHOD AND DEVICE FOR ALTERING REPETITION RATE IN A MODE-LOCKED LASER

CROSS REFERENCE TO RELATED APPLICATIONS

This application claims the priority benefit of U.S. Provisional Patent Application No. 62/515,774 filed Jun. 6, 2017 for "Methods for Altering Repetition Rate of a Pulsed Laser," of Juan Pino and Eng Hiang Mark Yeo, hereby incorporated by reference in its entirety as though fully set forth herein.

BACKGROUND

Pulsed lasers typically can be categorized as Q-switched, gain-switched, quasi-continuous wave, excimer, or mode-locked lasers. Of these, mode-locked lasers enable extremely short pulses and hence high peak powers. In addition, each of the longitudinal modes of a mode-locked laser provides specific phase relationships with every other longitudinal mode, which enables highly coherent systems such as, but not limited to, frequency combs. Mode-locked lasers typically are said to include solid state lasers, semiconductor lasers, dye lasers, and fiber lasers.

DETAILED DESCRIPTION

Mode-locked lasers based on doped fibers have a number of advantages over other laser technologies. Fiber lasers spread the gain out over a large area, and as a result, tend to not suffer from the sort of thermal breakdown that solid state lasers are subject to. The fiber itself can be physically configured in a variety of ways, allowing compact designs that can be easily incorporated into larger systems. For applications requiring the laser light to eventually enter a fiber, the design is very practical, with extremely low coupling loss. Polarization maintaining (PM) fiber configurations have demonstrated robust mode locking, and are additionally able to withstand mechanical shocks, accelerations, etc.

Mode locking can be achieved actively or passively. In active configurations, an electro-optic effect is periodically modulated at the characteristic repetition rate of the laser. For such systems, a "start-up routine" is typically implemented to begin the mode locking, for example, by invoking an algorithm or by a trained user.

Passively mode-locked lasers need a saturable absorbing medium within the laser cavity to achieve mode locking. A Semiconductor Saturable Absorbing Mirror (SESAM) may be provided for turn-key, self-starting mode locked lasers. Prior to introduction of the SESAM, mode locked lasers had complicated start up routines involving careful tuning of electro-optic modulator (EOM) drive frequencies, acousto-optic modulator (AOM) drive frequencies, polarization control, etc.

SESAMs suppress constant wave (CW) lasing by introducing optical-power-dependent absorption into the laser cavity. As the laser gain is increased, this absorption (as well as other inherent losses) dominates the gain, and the cavity produces amplified spontaneous emission (ASE). As the ASE grows, fluctuations of higher incident power on the SESAM saturate the absorption of the device, and the overall gain quickly outweighs the loss for shorter and higher intensity pulses, and the device begins to mode-lock. Now the cavity energy is contained in a pulse, allowing the SESAM time to recover. When the pulse travels back to the SESAM the process is repeated.

Self-starting is an important aspect of functional mode locking outside of the laboratory. Applications outside of the laboratory are enabled by the ability of the laser to mode lock without complicated algorithms or manual tuning of alignments or electrical signals.

In a mode-locked laser, the repetition rate (e.g., the temporal rate of the laser pulse) is set by the overall cavity length and the group velocity of the medium. The group velocity is a difficult parameter to tune on the fly, and so the repetition rate is adjusted by changing the overall cavity length instead. For fiber lasers, cavity length adjustment is often accomplished by physically stressing, or pulling, on the fiber through a piezoelectric transducer (or other mechanical device) glued or otherwise affixed to the fiber itself.

Physically stressing optical fiber suffers from a number of problems. While fiber stretchers are commonplace, the length, type, and components in a particular laser oscillator are unique, which limits the ways in which most commercial fiber stretchers can be incorporated. In addition, the performance of fiber stretchers is less than optimal in many cases. Large fiber stretchers (e.g., those that affect about 1 cm or more of the fiber) inherently have slower response times. This can be problematic when trying to make a closed-loop system with fast feedback.

Smaller fiber stretchers have much faster response times. However, transferring the full displacement of the piezoelectric transducer to the laser cavity is imperfect, often losing a factor of about ten in the process. Finally, construction of a fast fiber stretcher is difficult, as fiber bends can introduce unwanted resonances, fiber breaks, and additional cavity loss due to small radius bends in the fibers.

The systems and methods disclosed herein enable a semiconductor saturable absorber mirror (SESAM) to be mounted onto and displaced by a piezoelectric transducer ("piezo"), thereby changing the repetition rate of a mode-locked pulse laser without the need to stretch the fiber.

Before continuing, it is noted that as used herein, the terms "includes" and "including" mean, but are not limited to, "includes" or "including" and "includes at least" or "including at least." The term "based on" means "based on" and "based at least in part on."

Figure 1:
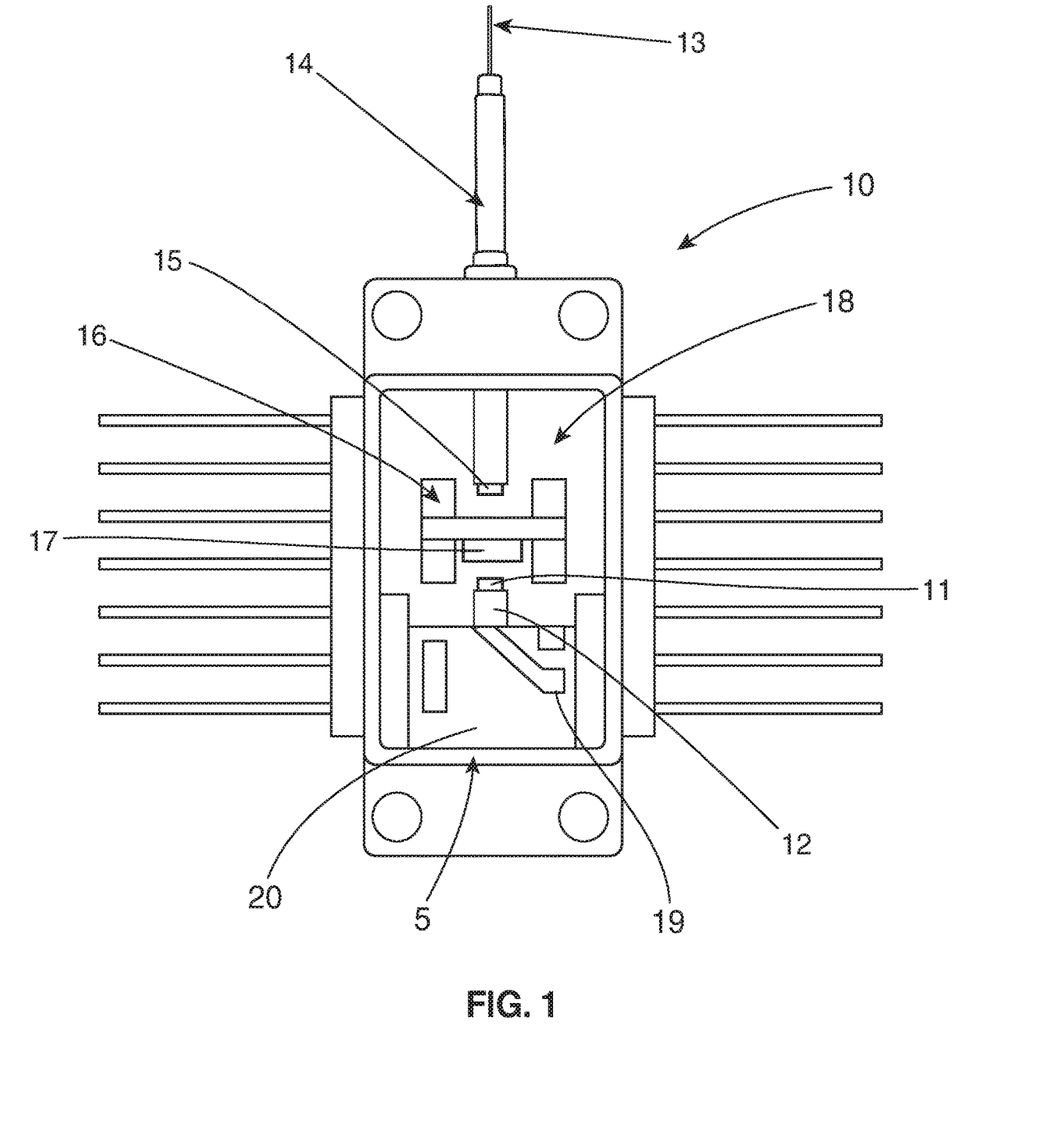
FIG. 1 is a top-down view of an example mode locking device which may be implemented for altering repetition rate in a mode-locked laser.

FIG. 1 shows an example mode locking device 10 which may be implemented for altering repetition rate in a mode-locked laser. In an example, the mode locking device 10 includes a semiconductor saturable absorber mirror or SESAM 11. The SESAM 11 is mounted on and displaced by a piezoelectric transducer 12.

In an example, the SESAM 11 provides a mechanism for mode-locking a laser. It is an effective mechanism for self-starting a mode-locked laser, and simplifies the laser start up routine. In order for the SESAM 11 to properly function, the incident fluence (pulse energy/area) of the laser pulse is well matched to the saturation fluence of the SESAM 11.

For mode locked lasers, an effective way to tune the repetition rate (as well as the cavity modes) is by physically changing the optical path length of the light inside the cavity 18. This can be accomplished by physically changing the refractive index within the cavity, or by physically changing the cavity length. Cavity length can be changed by temperature controlling an element in the cavity to expand or contract, physically stressing an element in the cavity to similarly expand or contract. Cavity length can also be changed by physical manipulation of a cavity mirror through piezoelectric transducer 12 or similar device. The device 10 may be implemented for piezo tuning of the cavity length through direct manipulation of the saturable absorbing mirror (SAM).

It is noted that the systems and methods disclosed herein are directed to a fiber laser for purposes of illustration. However, functionally it is a free-space mechanism and therefore is not limited to implementation with a fiber laser. Other laser technologies may also benefit from incorporating components and/or operating in conjunction with components of the device 10.

An optical fiber 13 provides an optically guided pathway for laser light to travel into a comb locker package 5. The laser light is coupled into the cavity 18 through fiber pigtail collimator 14, which collimates the laser light. The physical diameter of the collimator 14 may be selected for a close tolerance fit with the female barrel 15 such that the collimator 14 may be longitudinally adjusted with high precision within barrel 15.

A focusing lens 17 is provided to focus the laser light such that the light forms an appropriate spot size on the SESAM 11. The focusing lens 17 may be selected such that the focused spot of laser light gives a fluence appropriate for the SESAM 11. The lens is also manipulated or aligned to maximize back-reflection into the fiber.

The example SESAM 11 is shown in FIG. 1 mounted onto a piezoelectric transducer 12 in the cavity 18. Should the SESAM 11 itself have need for electrical connections, the device also enables wire bonding or epoxy connectors to the package 5 or mounting block 16.

In an example, the maximum displacement of the piezo material of the piezoelectric transducer 12 may be about 2 microns, with response rates in the hundreds of kHz. The geometry of the piezo material may be selected such that when the piezoelectric transducer 12 displaces the SESAM 11, the laser light coupling back into the optical fiber 13 is unaffected, and the piezo displacement is within the Rayleigh range of the focused spot.

In an example, the retro-reflecting nature of the device 10 may also be compatible with polarization-maintaining geometries. For example, the components in the free-space may be selected to have no birefringence.

In an example, the free-space section in the cavity 18 (e.g., between the collimator 14 and the focusing lens 17) also enables placement of additional optical and electro-optic elements, including but not limited to, optical filters, dichroic mirrors, polarizers, electro-optic modulators, etc.

The free-space design allows for active, coarse tuning of the cavity length during construction. In an example, the collimator 14 may be slid in and out of the package 5 while maintaining alignment. The cavity repetition rate can then be monitored while the laser is mode locked by monitoring the laser output with a photodiode whose bandwidth is higher than the laser repetition rate. While actively monitoring the repetition rate, the length of the oscillator cavity can be controlled by changing the position of the collimator lens with respect to the SESAM position, and then fixing in place with solder or glue, thus enabling one to precisely tune the repetition rate to a specific value. In an example, this could be used for constructing a pair of mode-locked lasers with matched repetition rates thus eliminating the problem of cutting optical fiber lengths to precise tolerances.

The design of the free-space also allows for active, coarse tuning of the cavity length during laser construction. In an example, the collimator 14 may be slid in and out of the package, while maintaining alignment. The cavity repetition rate can then be monitored as the laser is mode-locked. Furthermore, the cavity repetition rate can be tuned in this active configuration, enabling laser construction with precise repetition rates, or constructing a pair of lasers with matched repetition rates.

Before continuing, it should be noted that the examples described above are provided for purposes of illustration, and are not intended to be limiting. Other devices and/or device configurations may be utilized to carry out the operations described herein.

Figure 2:
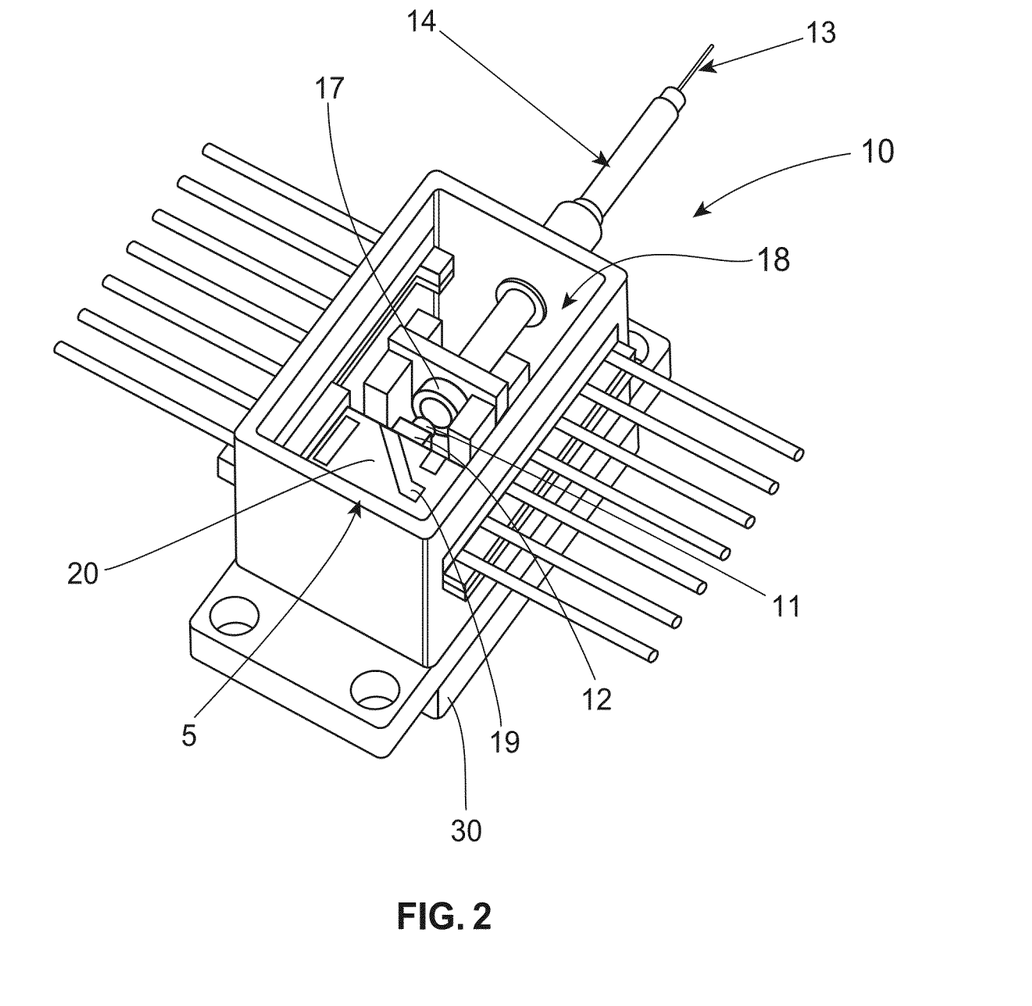
FIG. 2 is a perspective view of the example mode locking device.
Figure 3:
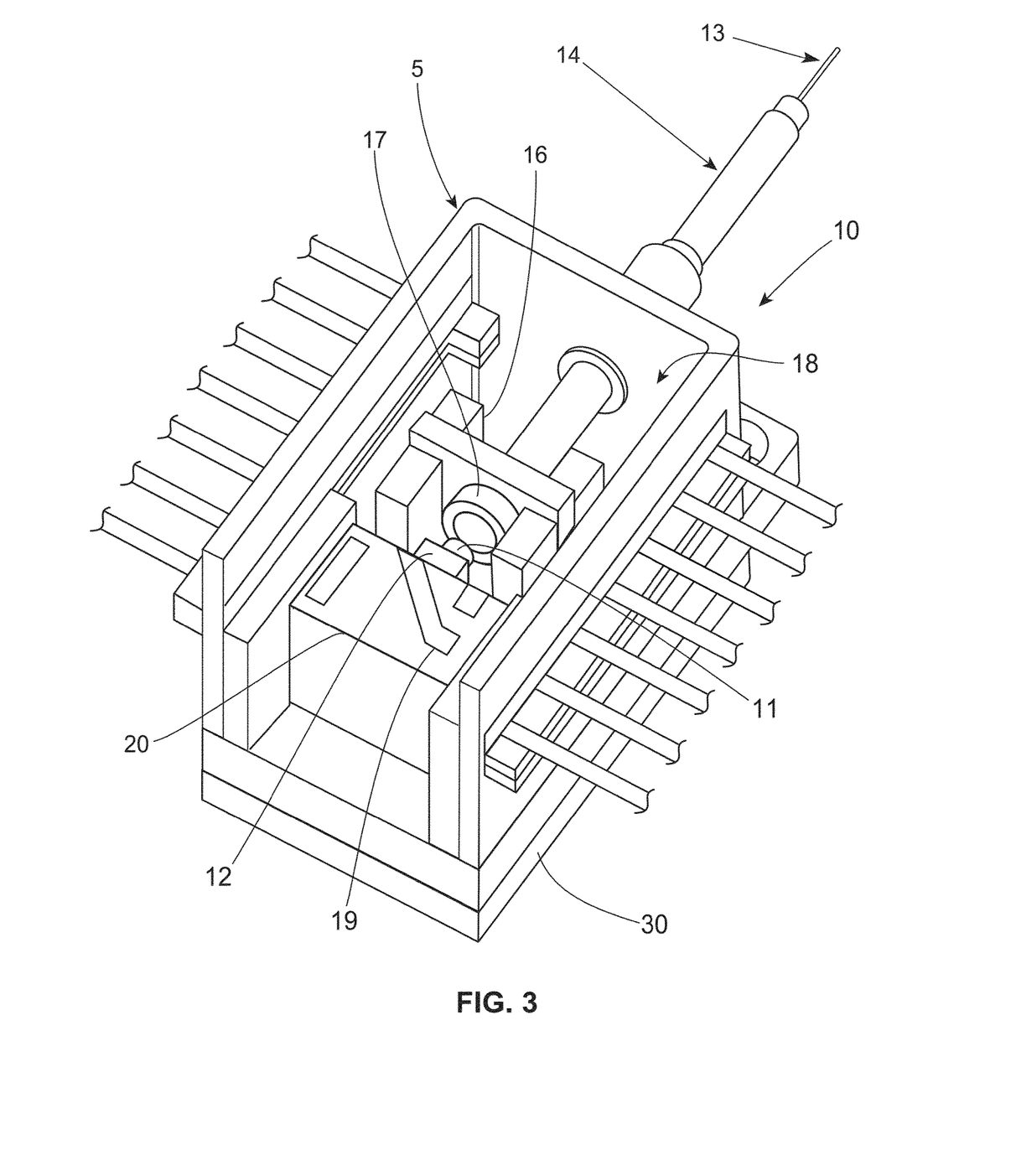
FIG. 3 is a cutaway isometric view of the example mode locking device shown in FIG. 2.

FIG. 2 shows an example mode locking device 10. FIG. 3 is a cutaway isometric view of the example mode locking device 10 shown in FIG. 2. The cutaway provides a better understanding of the spatial relationship between the elements. Particularly visible are the piezoelectric transducer 12, optical fiber 13, pigtail collimator 14, focusing lens 17, conductive traces 19, and dielectric material 20.

The example device 10 shown in FIGS. 2 and 3, includes a mounting block 24 to support the piezoelectric transducer 12 and/or the SAM or SESAM 11. It is noted that the mounting block 24 can also support the traces 19 and dielectric material 20, or may be made of dielectric material and thus be the same object as the dielectric material 20. Because of its mass and inertia, the mounting block 24 may also damp vibrations and resonant mechanical modes, thereby increasing the bandwidth of the piezoelectric transducer 12.

The example device 10 shown in FIGS. 2 and 3, includes an optical fiber 13 in a pigtailed collimator 14. This collimator 14 serves to launch the light into the mode locking package 5 at an angle substantially normal or perpendicular to the surface of the SESAM 11.

In an example, the launched light is collimated. Collimated light enables later focusing of the light onto the SESAM 11. Collimated light also enables translating the position of the collimator 14 along its long axis. During the build process, translation of the collimator enables coarsely tuning the free space optical path length of the mode locking. In an example, the collimator may translate over a distance of 3 cm, although other translation ranges may also be provided.

The light is focused onto the SESAM 11 by the lens 17. This configuration is referred to as a cat's eye retroreflector. Being less prone to alignment errors, this configuration enables the mode locking device 10 to perform its functions compactly, efficiently, and reliably.

In an example, the mode locking device 10 provides for a symmetric design. That is, the incident and reflected light both travel along the same path. This configuration also enables efficient retroreflection and back coupling of the light into the fiber 13. Coupling efficiency is important, as increased loss adversely affects laser performance.

Another benefit of the cat's eye configuration is the ability to translate the position of the SESAM 11 without affecting the coupling efficiency. When the focusing lens 17 is selected such that the SESAM translation is smaller than the Rayleigh range of the focused beam, the retro-reflected beam is mostly, if not completely, insensitive to changes in the position of the SESAM 11.

It is noted that in another example, the SESAM 11 may be replaced with a saturable absorber mirror (SAM) without fundamentally altering the operation of the mode locking device 10.

In an example, piezoelectric transducer 12 is controlled by a voltage applied between conductive traces 19, which may be patterned onto a dielectric material 20. The traces 19 may be gold, silver, aluminum, or any other conductive material suitable for applying the voltage. Dimensions of the traces 19 are important only insofar as the traces 19 do not overheat or interfere with one another. The dielectric material 20 may be polymer, ceramic, or any other patternable, electrically insulating material.

Figure 4:
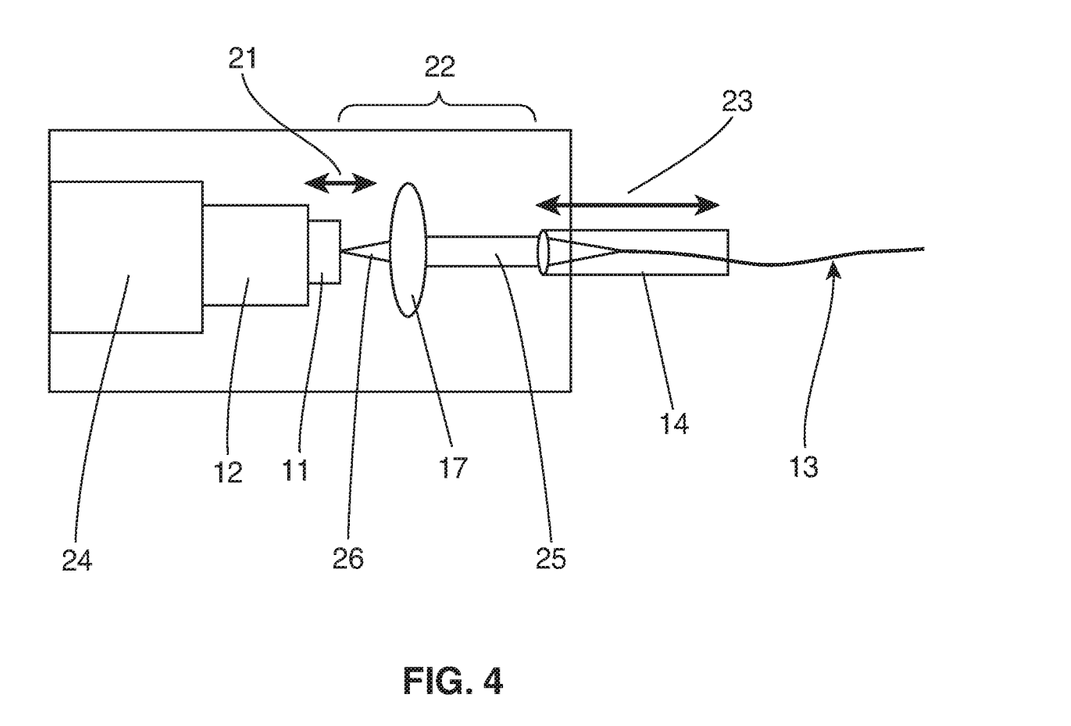
FIG. 4 is a diagram of the mode locking device shown in FIGS. 1-3.

FIG. 4 is a diagram of the mode locking device 10 shown in FIGS. 1-3. During operation, the mode locking device 10 may include translating the position of the SAM or SESAM 11 back and forth (e.g., as illustrated by arrows 21) along the mirror travel range. This adjusts the free space distance 22 to tune the optical path length of the mode locking device 10. Similarly, the collimator 14 can translate back and forth (e.g. as illustrated by arrows 23) along the collimator travel range to tune the optical path length of the comb locker device 10.

The design of the mode locking device described herein is fully compatible with a polarization-maintaining fiber system. That is, when a polarization-maintaining fiber system is provided, the retroreflected beam has substantially the same polarization as the incident beam, allowing for a simple design and geometry because the polarization axis of the incoming light does not need to be aligned to any part of the mode locking.

In this design, the cat's eye retroreflector is formed by the combination of the focusing lens 17 and the SAM or SESAM 11. The lens 17 bends the collimated light 25 from the collimator 14 into focused light 26 that impinges onto the SESAM 11. If the focus of the focused light 26 occurs at the surface of the SESAM 11, the reflected light from the SESAM 11 can be aligned to counter-propagate with nearly the same spatial mode as the input light and thus achieve good coupling efficiency back into the optical fiber. In this manner, the optical power losses in the mode locking device 10 are minimized, which helps in achieving good lasing performance.

The diameter of the beam of collimated light 25 (e.g., as determined by the collimator), and the focal length of the focusing lens 17, determine the spot size of the focused light 26 on the SESAM 11. Two criteria for the spot size should be simultaneously met. One criterion includes minimizing coupling losses. To minimize coupling losses, the desired mirror travel range 21 must be less than the Rayleigh range of the focused light 26 (which is proportional to the square of the spot diameter of the focused light 26). Another criterion includes the spot diameter of the focused light 26 on the SESAM 11. The spot size should be selected so that stable mode locking is achieved. The exact spot size depends on several factors, among these being the saturation fluence (pulse energy per area) of the SESAM 11, the gain and loss in the fiber laser cavity 18, and the desired output pulse shape from the laser.

The spot size influences whether stable mode locking occurs at all. The spot size also influences how short the pulse is (and therefore how wide the bandwidth of the output light is).

The travel range of the mirror comes from two aspects. In order to minimize optical losses, the retro-reflected light off the SESAM 11 should have the same spatial mode profile as the light first exiting the collimator 14. This maximizes the amount of light recoupled into the collimator 14, thus reducing overall loss, and improves the lasing efficiency and minimizes phase noise in the laser modes. In normal operation, the focus is near the face of the SESAM. A length scale to compare the distance between the focal plane and the SESAM face is the Rayleigh range where distances below the Rayleigh range leads to efficient coupling and distances comparable to and larger than the Rayleigh range will lead to poor coupling.

In addition, the intensity dependent reflection coefficient of the SESAM 11, depends on the fluence of the circulating pulse. As the fluence scales inversely with spot size on the SESAM face, the ideal condition would occur again when the focus of the beam coincides with the SESAM face. When the distance of the focal plane to the SESAM face is small compared to the Rayleigh range, the spot size is very close to ideal whereas if the distance of the focal plane to the SESAM face is comparable or larger to the Rayleigh range, then the spot size will be larger. Therefore, much higher pump powers may be required to attain mode-lock.

Figure 5:
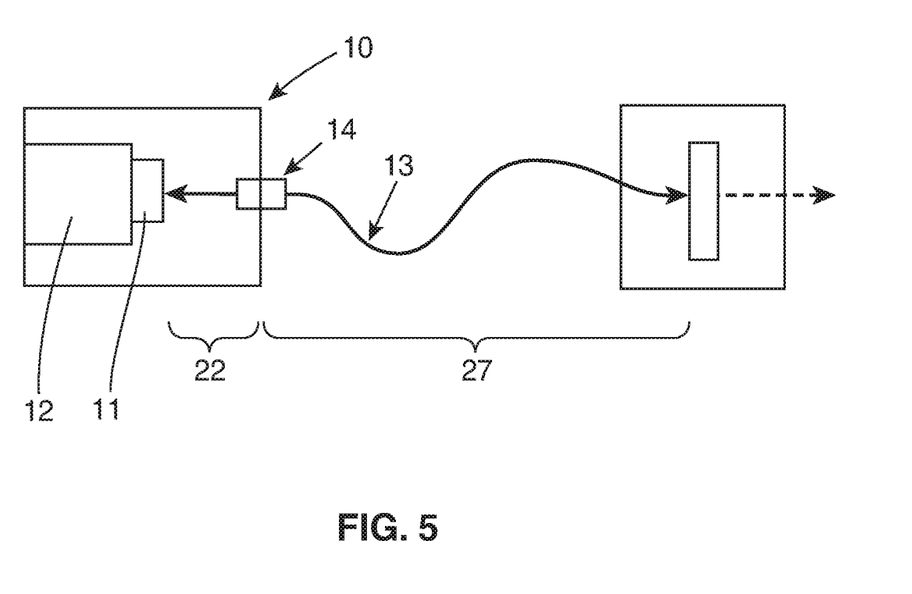
FIG. 5 shows an example of the mode locking device as it may be implemented in a mode locked fiber laser.

FIG. 5 shows an example comb locker device 10 as it may be implemented in a mode-locked fiber laser. In this example, the overall repetition rate of the mode-locked laser is set by the overall length of the laser cavity, which is the sum of the free space distance 22 and the fiber length 27, divided by the average round trip group velocity. For a linear cavity, the repetition rate is given by the following formula:

$$F_{rep} = \frac{c}{2(n_{g,air}L_{air} + n_{g,fiber}L_{fiber})} \quad \text{EQN 1}$$

Where $n_{g,air}$ and $n_{g,fiber}$ are the group indices of air and fiber respectively. $L_{air}$ and $L_{fiber}$ are the physical lengths of the free space distance 22 and the fiber length 27. The group velocities in air and fiber are given by $v_{g,air}=c/n_{n,air}$ and $v_{g,fiber}=c/n_{g,air}$ so that the repetition rate can be rewritten as:

$$F_{rep} = \frac{1}{2(L_{air}/v_{g,air} + L_{fiber}/v_{g,fiber})} \quad \text{EQN 2}$$

To tune the overall repetition rate, the user must control one of these two parameters (i.e., overall length, or average round trip group velocity). Controlling the group velocity can be accomplished by temperature tuning the laser fiber. But this is a slow effect and also affects the offset frequency of a frequency comb built using this system. The user can more quickly tune the fiber length with a fiber stretcher as discussed, but this also has drawbacks.

Instead, the systems and method disclosed herein control the free space distance 22. During laser builds, the mode locking design can also coarsely tune the length of the distance 22 and free space by translating the position of the collimator without affecting the fiber coupling, or mode locking characteristics of the laser. This is especially important for systems where the repetition rate must be a precise value. The method includes coarse tuning of the repetition rate while actively monitoring the repetition rate of the laser while energized.

Before continuing, it is noted that the operations shown and described herein are provided to illustrate example implementations. It is noted that the operations are not limited to the ordering shown. Still other operations may also be implemented.

By way of illustration, a further example may include a robust free-space section within a fiber laser cavity, made possible by the cat's eye retro-reflector topology. As will be readily appreciated by those having ordinary skill in the art after becoming familiar with the teachings herein, this implementation enables many advantageous variations.

Example implementations of the mode locking device 10 are described below.

Temperature Tuning with Thermo-Electric Cooler (TEC)

In an example based on design considerations, the mode locking device 10 enables temperature control of the SESAM independent of cavity length. A heating element, or thermoelectric element, is placed or positioned alongside the mounting block, or be positioned directly on the end of the piezoelectric material. This enables tuning the Bragg grating of SESAM 11 by altering the index and spacing of the thin-film Bragg stacks of the SESAM. In this manner, temperature tuning of the SESAM can provide independent, orthogonal control over the carrier-envelope phase of the pulsed output of the mode-locked laser, which is important for optical frequency comb applications. Similar behavior has been observed by using fiber Bragg gratings. Independent temperature control of the mode locker cavity 18 can be achieved by thermally contacting a TEC 30 to an outside surface of butterfly case of the mode locker 10.

Free Space Filters (Polarization, Spectral).

Figure 6:
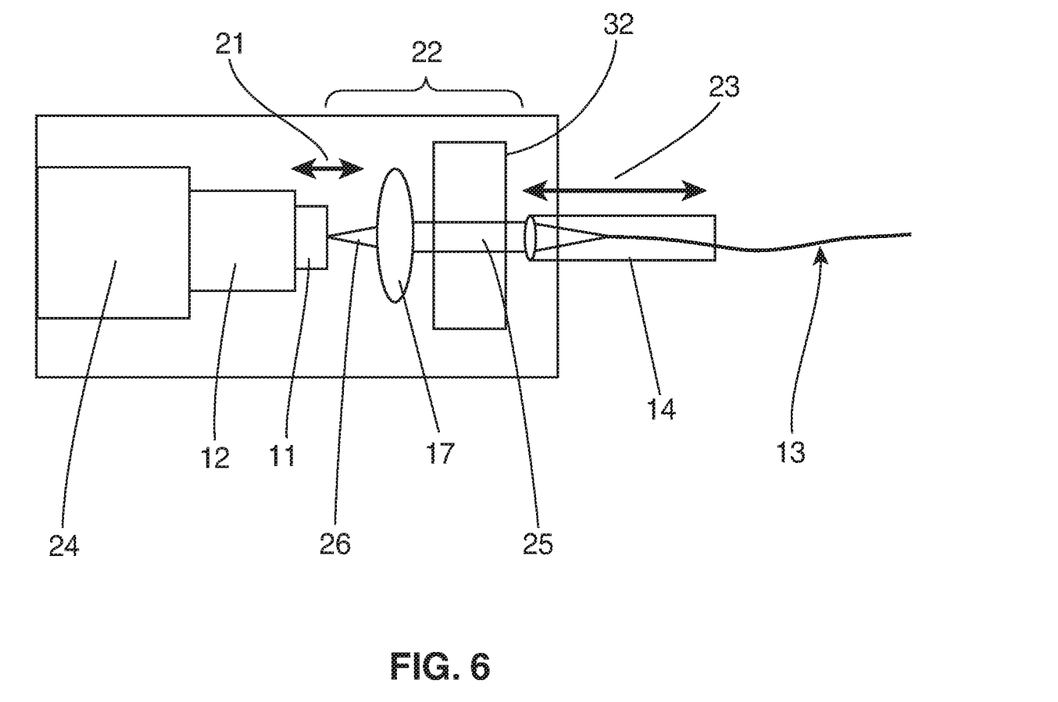
FIG. 6 is another diagram of an example mode locking device.

In an example based on design considerations, the mode locking device 10 also enables a collimated free space section within the laser cavity. FIG. 6 is another diagram of an example mode locking device illustrating an example of collimated free space 32. Optical elements may be provided to improve or alter laser performance. These elements may include, but are not limited to, optical filters to attenuate optical wavelengths that are unwanted within the laser cavity, such as high-pass, low-pass, bandpass, and notch filters. These elements may also include, but are not limited to, polarizers to attenuate unwanted polarizations within the cavity.

For example, high-bandwidth, electro-optic intensity modulators such as graphene modulators or polarization altering devices in conjunction with intracavity polarization loss or polarizers such as PLZT, PMN-PT or PZN-PT crystals, in a general class of materials known as "OptoCeramics," can be used in the free-space section to rotate the polarization into the non-lasing polarization state creating electronically controlled loss with very high bandwidth over a thin optical element. These are useful for modulation of the carrier envelope offset frequency or phase.

Electro-Optics.

In an example based on design considerations, the free space section within the mode locking device 10 may also incorporate electro-optic elements within the cavity 18. An example may include bulk media, and/or waveguide devices. Example electro-optics may include phase modulators (e.g., electro-optic modulators, liquid crystals), frequency modulators (e.g., acousto-optic modulators), polarization rotation (e.g., liquid crystals, electronically controlled Faraday materials), and intensity modulators (e.g., crossed polarizers, beam deflectors), to name only a few examples.

Pump and Second Fiber.

Figure 7:
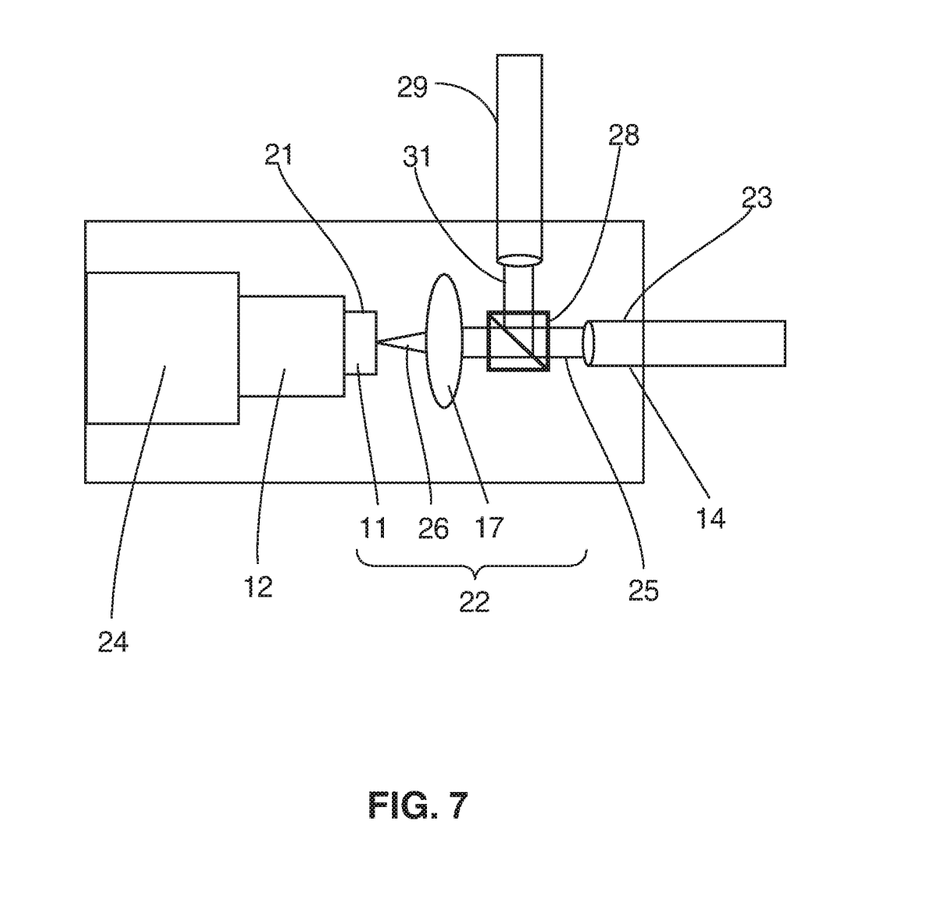
FIG. 7 is another diagram of an example mode locking device.
Figure 8A:
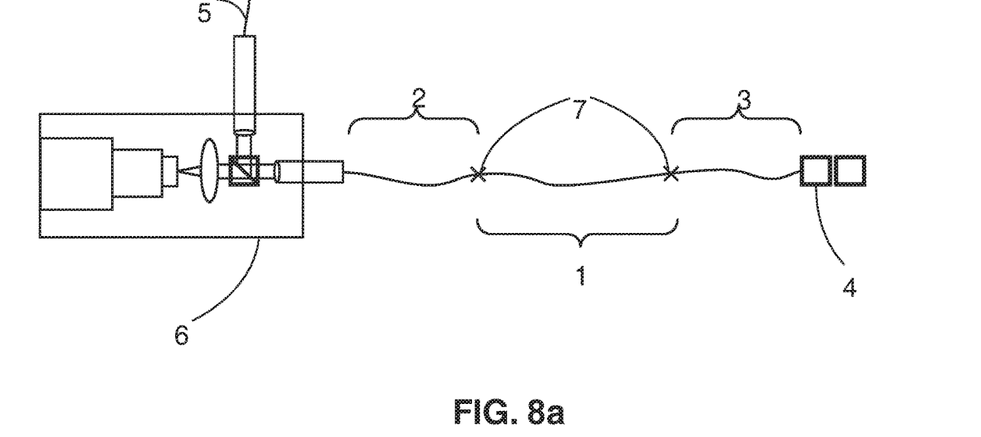
FIG. 8a shows a micro-optic wavelength division multiplexer (WDM) inserted into the free-space section to enable pump light to enter the laser cavity and gain section.
Figure 8B:
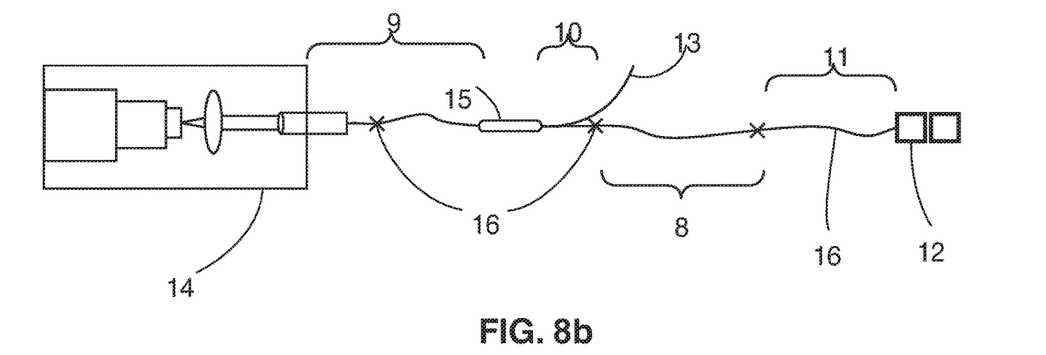
FIG. 8b shows the WDM as a dichroic beam splitter that reflects the pump wavelength and transmits the lasing wavelength.

FIG. 7 is another diagram of an example mode locking device with dichroic mirror 28 and pump light collimator 29 for providing collimated pump light. FIG. 8a illustrates gain medium 1, passive fiber 2, 3, output coupler 4, pump input 5, comb locker with WDM 6, and fusion splices 7. FIG. 8b illustrates gain medium 8, passive fiber 9, 10, 11, output coupler 12, pump input 13, comb locker 14, fiberdized WDM 15, and fusion splices 16.

FIG. 8a shows a micro-optic wavelength division multiplexer (WDM) inserted into the free-space section 18 to enable pump light to enter the laser cavity and gain section. In an example configuration, the WDM is a dichroic beam splitter 28 that reflects the pump wavelength and transmits the lasing wavelength. This configuration eliminates the need for fiberdized WDM (FIG. 8b) inside the laser cavity and has several advantages. Examples include, but are not limited to, the laser cavity can be made smaller allowing for higher pulse repetition rates. In addition, the design is more flexible and can allow a wider variety of pump laser wavelengths. Pump light can be prevented from illuminating the SAM or SESAM, which can be important for high-energy pump wavelengths. The losses inherent with a fiberdized WDM are reduced thereby reducing phase noise in the laser.

Multiple PZT Transducers.

Figure 9:
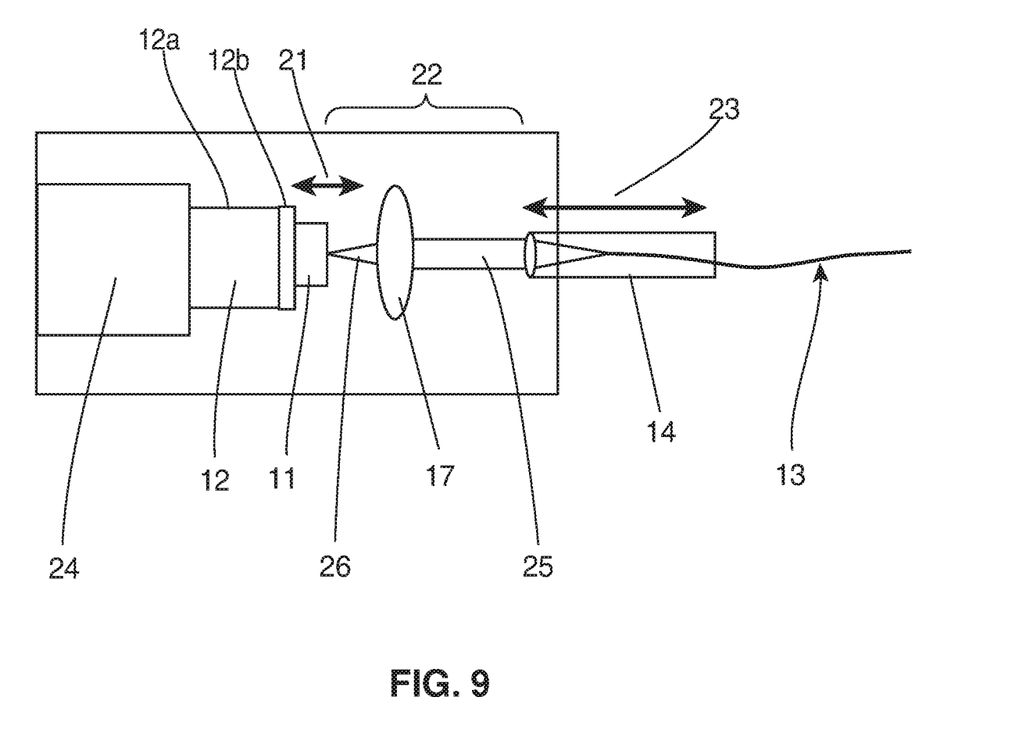
FIG. 9 is another diagram of an example mode locking device.

In an example based on design considerations, multiple piezoelectric transducers may be provided to achieve both large dynamic range and high bandwidth response. In an example, multiple piezoelectric transducers could also be stacked on top of each other. FIG. 9 is another diagram of an example mode locking device showing a larger, slower tuning piezoelectric transducer or section 12a providing a longer stroke, and a smaller, faster tuning piezoelectric transducer or section 12b for tighter control over the repetition rate.

Direct Focusing to Eliminate the Free-Space Section of Collimated Light.

An example simpler optical layout for the mode locking device may include replacing the focusing lens and collimator with a single focusing lens located near or attached directly to the end of the input optical fiber. For example, a ball or GRIN lens can be glued or otherwise attached directly to the fiber to achieve properly focused light without need for collimation.

These and other examples are also contemplated. It is noted that the examples shown and described are provided for purposes of illustration and are not intended to be limiting.

The invention claimed is:

1. A method of matching repetition rates of at least two physically independent mode-locked lasers, comprising:
   providing a mode locking device with a package defining a cavity, a collimator having an optical fiber, a focusing lens, and a SESAM;
   coupling laser light from a first mode-locked laser to the optical fiber and through the collimator to create collimated light that enters into the cavity of the mode locking device;
   focusing the laser light through the focusing lens to an appropriate spot size onto the SESAM;
   while the first mode-locked laser is operating and mode-locked, controllably translating a position of the collimator relative to the package and in a substantially linear direction along a length of the cavity to alter a length of the cavity such that a repetition rate of the first mode-locked laser is matched to a repetition rate of second mode-locked laser, wherein the translating is such that the tip of the optical fiber maintains a predominantly normal orientation to the cavity of the mode locking device;
   maintaining a saturation of the SESAM to ensure continuous mode-locking of the first mode-locked laser as the collimator is translated;
   aligning the lens to maximize back reflection into the optical fiber; and
   fixing the position of the collimator to precisely set the repetition rate of the first mode-locked laser.

2. The method of claim 1, further comprising free space aligning of the focused laser light onto the SESAM.

3. The method of claim 1, further comprising mounting the onto a piezoelectric transducer.

4. The method of claim 3, further comprising providing conductive traces to the piezoelectric transducer onto which the SESAM is mounted.

5. The method of claim 1, wherein the fixing the position of the collimator includes soldering the collimator in place to the package.

6. The method of claim 1, further comprising providing a cat's-eye retro-reflector configuration between the focusing lens and the SESAM to align the laser light onto the SESAM to achieve robust fiber coupling.

7. The method of claim 1, further comprising providing one or more optical elements in a light path of the mode locking device, the optical elements selected from high-pass filters, low-pass filters, bandpass filters, notch filters, attenuators, electro-optic modulators, polarizers, bulk media, and waveguides.

8. The method of claim 1, further comprising providing a dichroic mirror in a freespace section of the cavity to effectuate wavelength division multiplexing.

9. The method of claim 1, wherein cavitywherein the fixing the position of the collimator includes gluing the collimator in place to the package.

10. The method of claim 1, wherein the optical fiber includes a polarization-maintaining fiber.

11. A mode-locking device for altering a repetition rate of a mode-locked laser, comprising:
    a package;
    an optical fiber adapted to be connected between the mode-locking device and the mode-locked laser while the mode-locked laser is operating;
    a sliding collimator, the collimator having a portion of the optical fiber therein, wherein the position of the collimator relative to the package is adjustable by sliding the collimator;
    a focusing lens;
    a piezoelectric transducer controlled by an applied voltage; and
    a SESAM in association with the piezoelectric transducer;
    wherein the collimator is configured to launch light, received from the mode-locked laser, through the focusing lens onto the SESAM at an angle substantially perpendicular to a surface of the SESAM, wherein sliding the position of the collimator enables coarsely tuning a free space optical path length of the mode-locking device while continuously maintaining mode-locking of the mode-locked laser, to thereby adjust and to set the repetition rate of the mode-locked laser, and wherein the position of the collimator is fixed in place in the mode-locking device after the repetition rate of the mode-locked laser has been set.

12. The mode locking device of claim 11, wherein after the repetition rate of the mode-locked laser has been set by the mode locking device, the position of the collimator is fixed in place via glue.

13. The mode locking device of claim 11, further comprising at least one of a high-pass filter, low-pass filter, notch filter, bandblock filter, electro-optic modulator, and waveguide.

14. The mode locking device of claim 11, further comprising a dichroic mirror in a free space section of a cavity of the package to effectuate wavelength division multiplexing.

15. The mode locking device of claim 11, wherein the optical fiber includes a polarization-maintaining fiber.

16. The mode locking device of claim 11, wherein after the repetition rate of the mode-locked laser has been set by the mode locking device, the position of the collimator is fixed in place via solder.

17. A mode locking device for altering a repetition rate of a mode-locked laser, comprising:
    a package having a free-space cavity defined therein;
    an optical fiber adapted to be connected to the mode-locked laser while the mode-locked laser is operating and is mode-locked;
    a collimator, the collimator having a portion of the optical fiber therein, wherein a position of the collimator relative to the package is adjustable by sliding the collimator;
    a focusing lens;
    a piezoelectric material controlled by an applied voltage;
    SESAM mounted on the piezoelectric material;
    wherein the collimator is configured to receive light from the mode-locked laser while the mode-locked laser is operating and is mode-locked, and the collimator is configured to launch said light at an angle substantially normal to a surface of the SESAM, wherein sliding the position of the collimator enables tuning a free space optical path length of the mode locking device over a range including about 3 centimeters while mode-locking of the mode-locked laser is continuously maintained throughout the sliding of the position of the collimator;
    wherein adjustment of the position of the collimator changes the repetition rate of the mode-locked laser, and
    wherein the position of the collimator is fixed in place relative to the mode locking device after the repetition rate of the mode-locked laser has been set.

18. The mode locking device of claim 17, wherein after the repetition rate of the mode-locked laser has been set by the mode locking device, the position of the collimator is fixed in place via glue.

19. The mode locking device of claim 17, further comprising:
   one or more optical elements selected from high-pass filters, low-pass filters, bandpass filters, notch filters, attenuators, dichroic mirrors, electro-optic modulators, polarizers, bulk media, and waveguides.

20. The mode locking device of claim 17, wherein after the repetition rate of the mode-locked laser has been set by the mode locking device, the position of the collimator is fixed in place via solder.

* * * * *